(12) United States Patent
Oney et al.

(10) Patent No.: US 9,489,035 B2
(45) Date of Patent: *Nov. 8, 2016

(54) EFFICIENT POWER MANAGEMENT OF A SYSTEM WITH VIRTUAL MACHINES

(71) Applicant: Microsoft Technology Licensing, LLC, Redmond, WA (US)

(72) Inventors: Adrian J. Oney, Woodinville, WA (US); Bryan Mark Willman, Kirkland, WA (US); Eric P. Traut, Bellevue, WA (US); Forrest Curtis Foltz, Woodinville, WA (US); Matthew D. Hendel, Seattle, WA (US); Rene Antonio Vega, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,453

(22) Filed: Dec. 15, 2015

(65) Prior Publication Data

US 2016/0109929 A1    Apr. 21, 2016

Related U.S. Application Data

(63) Continuation of application No. 14/563,986, filed on Dec. 8, 2014, now Pat. No. 9,218,047, which is a continuation of application No. 11/437,109, filed on May 18, 2006, now Pat. No. 8,909,946, which is a continuation-in-part of application No. 11/274,907, filed on Nov. 15, 2005, now Pat. No. 7,434,003.

(51) Int. Cl.
*G06F 1/30* (2006.01)
*G06F 21/53* (2013.01)

(Continued)

(52) U.S. Cl.
CPC ............... *G06F 1/3246* (2013.01); *G06F 1/30* (2013.01); *G06F 1/329* (2013.01); *G06F 1/3268* (2013.01);
(Continued)

(58) Field of Classification Search
CPC ............. G06F 17/00; G06F 17/30144; G06F 17/3015; G06F 9/455; G06F 9/50
USPC ........................... 713/300, 323, 324; 714/14
See application file for complete search history.

(56) References Cited

U.S. PATENT DOCUMENTS

| | | |
|---|---|---|
| 5,179,680 A | 1/1993 | Colwell et al. |
| 5,317,705 A | 5/1994 | Gannon et al. |

(Continued)

FOREIGN PATENT DOCUMENTS

| | | |
|---|---|---|
| GB | 2376761 A | 12/2002 |
| WO | WO 03/090070 A2 | 10/2003 |

OTHER PUBLICATIONS

U.S. Appl. No. 10/882,979, filed Jun. 6, 2004, Vega, et al.

(Continued)

*Primary Examiner* — Michael J Brown
(74) *Attorney, Agent, or Firm* — John Jardine; Dan Choi; Micky Minhas

(57) ABSTRACT

Efficient power management of a system with virtual machines is disclosed. In particular, such efficient power management may enable coordination of system-wide power changes with virtual machines. Additionally, such efficient power management may enable coherent power changes in a system with a virtual machine monitor. Furthermore, such efficient power management may enable dynamic control and communication of power state changes.

20 Claims, 12 Drawing Sheets

(51) Int. Cl.
*G06F 1/32* (2006.01)
*G06F 21/57* (2013.01)
*G06F 21/62* (2013.01)
G06F 17/30 (2006.01)
G06F 17/00 (2006.01)
G06F 9/455 (2006.01)
G06F 9/50 (2006.01)

(52) U.S. Cl.
CPC ......... *G06F 1/3287* (2013.01); *G06F 9/45545* (2013.01); *G06F 9/45554* (2013.01); *G06F 9/45558* (2013.01); *G06F 21/53* (2013.01); *G06F 21/575* (2013.01); *G06F 21/6245* (2013.01); *G06F 9/455* (2013.01); *G06F 9/50* (2013.01); *G06F 17/00* (2013.01); *G06F 17/3015* (2013.01); *G06F 17/30144* (2013.01); *G06F 2009/45562* (2013.01)

(56) References Cited

U.S. PATENT DOCUMENTS

| | | | |
|---|---|---|---|
| 5,586,283 | A | 12/1996 | Lopez-Aguado et al. |
| 5,617,553 | A | 4/1997 | Minagawa et al. |
| 5,699,543 | A | 12/1997 | Saxena |
| 5,787,494 | A | 7/1998 | DeLano et al. |
| 6,038,639 | A | 3/2000 | O'Brien et al. |
| 6,075,938 | A | 6/2000 | Bugnion et al. |
| 6,182,195 | B1 | 1/2001 | Laudon et al. |
| 6,308,231 | B1 | 10/2001 | Galecki et al. |
| 6,442,666 | B1 | 8/2002 | Stracovsky |
| 6,453,387 | B1 | 9/2002 | Lozano |
| 6,496,847 | B1 | 12/2002 | Bugnion et al. |
| 6,681,311 | B2 | 1/2004 | Gaskins et al. |
| 6,721,839 | B1 | 4/2004 | Bauman et al. |
| 6,785,886 | B1 | 8/2004 | Lim et al. |
| 6,907,600 | B2 | 6/2005 | Neiger et al. |
| 6,925,547 | B2 | 8/2005 | Scott et al. |
| 6,993,453 | B2 | 1/2006 | Krissell |
| 7,069,389 | B2 | 6/2006 | Cohen |
| 7,069,413 | B1 | 6/2006 | Agesen et al. |
| 7,111,145 | B1 | 9/2006 | Chen et al. |
| 7,111,146 | B1 | 9/2006 | Anvin |
| 7,149,832 | B2 | 12/2006 | Wieland et al. |
| 7,167,970 | B2 | 1/2007 | Jacobson et al. |
| 7,188,229 | B2 | 3/2007 | Lowe |
| 7,209,994 | B1 | 4/2007 | Klaiber et al. |
| 7,222,221 | B1 | 5/2007 | Agesen et al. |
| 7,225,441 | B2 | 5/2007 | Kozuch et al. |
| 7,254,733 | B2 | 8/2007 | Nichols et al. |
| 7,299,337 | B2 | 11/2007 | Traut et al. |
| 7,330,942 | B2 | 2/2008 | Dinechin et al. |
| 7,334,142 | B2 | 2/2008 | Hack |
| 7,356,665 | B2 | 4/2008 | Rawson, III |
| 7,363,463 | B2 | 4/2008 | Sheu et al. |
| 7,395,405 | B2 | 7/2008 | Anderson et al. |
| 7,434,003 | B2 | 10/2008 | Oney et al. |
| 7,512,769 | B1 | 3/2009 | Lowell et al. |
| 7,519,838 | B1 | 4/2009 | Suurballe |
| 7,529,906 | B2 | 5/2009 | Sheets |
| 7,552,426 | B2 | 6/2009 | Traut |
| 8,909,946 | B2 | 12/2014 | Oney et al. |
| 9,218,047 | B2 * | 12/2015 | Oney ............... G06F 21/53 |
| 2002/0083110 | A1 | 6/2002 | Kozuch et al. |
| 2003/0037089 | A1 | 2/2003 | Cota-Robles et al. |
| 2003/0172305 | A1 | 9/2003 | Miwa |
| 2004/0128670 | A1 | 7/2004 | Robinson et al. |
| 2004/0199599 | A1 | 10/2004 | Nichols et al. |
| 2005/0044301 | A1 | 2/2005 | Vasilevsky et al. |
| 2005/0080934 | A1 | 4/2005 | Cota-Robles et al. |
| 2006/0005190 | A1 | 1/2006 | Vega et al. |
| 2006/0112212 | A1 | 5/2006 | Hildner |
| 2007/0006227 | A1 | 1/2007 | Kinney et al. |
| 2007/0011444 | A1 | 1/2007 | Grobman et al. |
| 2008/0134174 | A1 | 6/2008 | Sheu et al. |
| 2008/0215848 | A1 | 9/2008 | Sheu et al. |

OTHER PUBLICATIONS

U.S. Appl. No. 10/985,360, filed Nov. 10, 2004, Wieland, P. et al.
U.S. Appl. No. 11/128,665, filed May 12, 2005, Traut, et al.
Chang, MS et al., "Lazy TLB Consistency for Large-Scale Multi-processors," IEEE, http://ieeexplore.ieee.org/iel3/4457/12637/00581683.pdf?tp=&arnumbe- -r=581683&isnumber=12637&htry=2, Mar. 17-21, 1997, 308-315.
King, S. et al., "Operating System Support for Vitrual Machines," Proceedings of the 2003 USENIX Technical Conference, http://www.eecs.umich.edu/virtual.sub.--papers/king03.pdf, Jun. 9-14, 2003, 14 pages.
LeVasseur, J. et al., "Pre-Virtualization: Slashing the Cost of Virtualization," Nat'l ICT Australia, Oct. 2005, 1-14.
Rosenburg, B.S., "Low-Synchronization Translation Lookaside Buffer Cosistency in Large-Scale Shared-Memory Multiprocessors," ACM, http://www.logos.t.u-tokyo.ac.jp/.about.tau/os-lecture/articles/p137-rose- - nburg.pdf#search=%22Translation-lookaside%20buffer%20consistency%22, Dec. 1989, 137-146.
Taylor, G. et al., "The TLB Slice—A Low-Cost High-Speed Address Translation Mechanism," IEEE, http://delivery.acm.org/10.1145/33000/325161/p355-taylor/pdf?key1=325161&- -key2=8514904611&coll=GUIDE&dl=GUIDE&CFID=4997640&CFTOKEN=80512607, Jun. 1990, 355-363.
VMware, Inc., "vmi.sub.—spec: Paravirtualization API Version 2.0," www.vmware.com/pdf/vmi.sub.--cpecs.pdf, Mar. 2006, 1-35.
Barham et al., "Xen and the art of virtualization," ACM Press, Proceedings of the Nineteenth ACM Symposuim on Operating Systems Principles, Oct. 19-22, 2003, 164-177.
Eranian, S. et al., "Virtualization Memory in a IA-64 Linux Kernel," Prentice Hall PTR, www.phptr.com/articles/article.asp?p+29961&seqNum+4&rl+1, Nov. 8, 2002, downloaded Aug. 31, 2006, 46 pages.
Uhlig, V. et al., "Towards Scalable Multiprocessor Virtual Machines," Proceedings of the 3rd Virtual Machine Research & Technology Symposium, San Jose, CA, http://14ka.org/publications/2004/Towards-Scalable-Multiprocessor-Virtual- - -Machines-VM04.pdf, May 6-7, 2004, 1-14.

* cited by examiner

EFFICIENT POWER MANAGEMENT OF A SYSTEM WITH VIRTUAL MACHINES

CROSS REFERENCE TO RELATED APPLICATION

This application is a continuation of U.S. patent application Ser. No. 14/563,986, filed Dec. 8, 2014, which is a continuation of U.S. patent application Ser. No. 11/437,109, filed May 18, 2006, now U.S. Pat. No. 8,909,946, issued on Dec. 9, 2014, which is a continuation-in-part of U.S. patent application Ser. No. 11/274,907 filed Nov. 15, 2005, now U.S. Pat. No. 7,434,003, issued on Oct. 7, 2008, the entirety of which is incorporated herein by reference.

BACKGROUND

Computers include general purpose central processing units (CPUs) that are designed to execute a specific set of system instructions. A group of processors that have similar architecture or design specifications may be considered to be members of the same processor family. Although a group of processors may be in the same family because of their similar architecture and design considerations, processors may vary widely within a family according to their clock speed and other performance parameters.

To facilitate a better understanding of the present invention, this document defines applications as programs that interact with users while relying on services and the kernel. Services are defined as programs that interact with each other and the kernel. Drivers are defined as a type of service that also interacts with hardware. Kernels are defined as programs that provide features for use by services and applications, such as arbitrated access to CPUs in the system. An operating system (OS) is furthermore defined as a product that encapsulates a kernel, some set of services, and some set of applications. Depending on the operating system, third parties may be able to create additional applications and services that interact with the operating system product.

Computer manufacturers want to maximize their market share by having more rather than fewer applications run on the microprocessor family associated with the computer manufacturers' product line. To expand the number of OSs and application programs that can run on a computer system, a field of technology has developed in which a given computer having one type of CPU, called a host, will include an emulator program that allows the host computer to emulate another computer system, called a guest. Thus, the host computer will execute an application that will cause one or more host instructions to be called in response to a given guest instruction. Thus the host computer can both run software design for its own hardware architecture and software written for computers having an unrelated hardware architecture. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a "virtual machine" as the guest computer system only exists in the host computer system as a pure software representation of the operation of one specific hardware architecture. The terms emulator, virtual machine, and processor emulation are sometimes used interchangeably to denote the ability to mimic or emulate the hardware architecture of an entire computer system.

The emulator program acts as the interchange between the hardware architecture of the host machine and the instructions transmitted by the software running within the emulated environment. As an emulator program can also be said to monitor the virtual machine, emulator programs are also called Virtual Machine Monitors (VMMs).

An emulator program may be a service under control of a host operating system, which is an operating system running directly on the physical computer hardware, in which case it is termed a Type II VMM. Alternately, the emulator program might be a software layer that runs directly above the hardware and which virtualizes all the resources of the machine by exposing interfaces that are the same as the hardware (which enables the hypervisor to go unnoticed by operating system layers running above it). In this configuration, the emulator program is termed a Type I VMM, and is called a hypervisor. Lastly, a host operating system and a Type II VMM service may share control over some set of the physical hardware, a hybrid configuration in which they can be said to run side-by-side.

In conventional OSs, certain OS activities are performed with an assumption that the operating system is running on dedicated physical hardware. For example, operating systems are accustomed to running on real hardware with a bank of physical memory beginning at zero. They are also accustomed to owning the page tables used to translate virtual addresses to physical addresses, along with the responsibilities of keeping each processor's virtual address to physical address translation caches (i.e., translation lookaside buffers or TLBs) up-to-date. To run such operating systems, a VMM virtualizes the page tables and TLBs. A VMM manages the real hardware page tables, but populates them using the contents from page tables built by the operating system only after some sanitization, effectively implementing a virtual TLB in software. The VMM further intercepts operating system usages of TLB-manipulating instructions to ensure the real page tables under its control are kept up-to-sync.

Current virtual machine software allow for virtualization, including the example described above. However, there is significant performance overhead associated with virtualization. The performance overhead can reach levels as high as 70%, particularly in software applications with memory- or I/O-intensive workloads (with heavy disk access or network communications). This level of overhead is unacceptable in applications that require maximum processor speed. What is needed is a way to reduce processor overhead in a virtual machine environment.

An unenlightened operating system is an operating system that is unaware of or indifferent to whether it is running on a VMM or not. Conventionally, the behavior of an operating system when running on virtualized hardware provided by a VMM is identical to that when running on the real hardware. What is needed is a way that an operating system and a VMM, an example of which is a hypervisor, work together and communicate with each other for efficient operation.

In particular, such coordination between operating systems and VMM's may provide a number of advantages when applied to power management procedures. For example, such coordination may enable virtual machines to take appropriate actions before and after a power change. Additionally, such coordination may provide additional security for data that is confidential to the virtual machines.

Furthermore, such coordination may enable more efficient and lower user of power and also provide a number of other efficiencies and advantages.

SUMMARY

Systems and methods are provided for implementing an operating system that is capable of ascertaining whether it is operating in a virtual machine environment and is further capable of modifying its behavior to operate more efficiently in a virtual machine environment. According to an embodiment, an operating system is enlightened so that it is aware of VMMs or hypervisors, taking on behavior that is optimal to that environment. Thus, an operating system runs efficiently in the presence of VMMs or hypervisors.

Several example techniques are presented to lower the cost of this virtualization through operating system enlightenments. According to an embodiment, the operating system submits requests to the hypervisor via a mechanism called a virtualization device.

According to other embodiments, the efficient operation of operating systems is applied to power management. In particular, in one embodiment, such efficient operation enables coordination of system-wide power changes with virtual machines. In another embodiment, such efficient operation enables coherent power changes in a system with a VMM. In yet another embodiment, such efficient operation enables dynamic control and communication of power state changes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Exemplary Computing Environment

Figure 1:
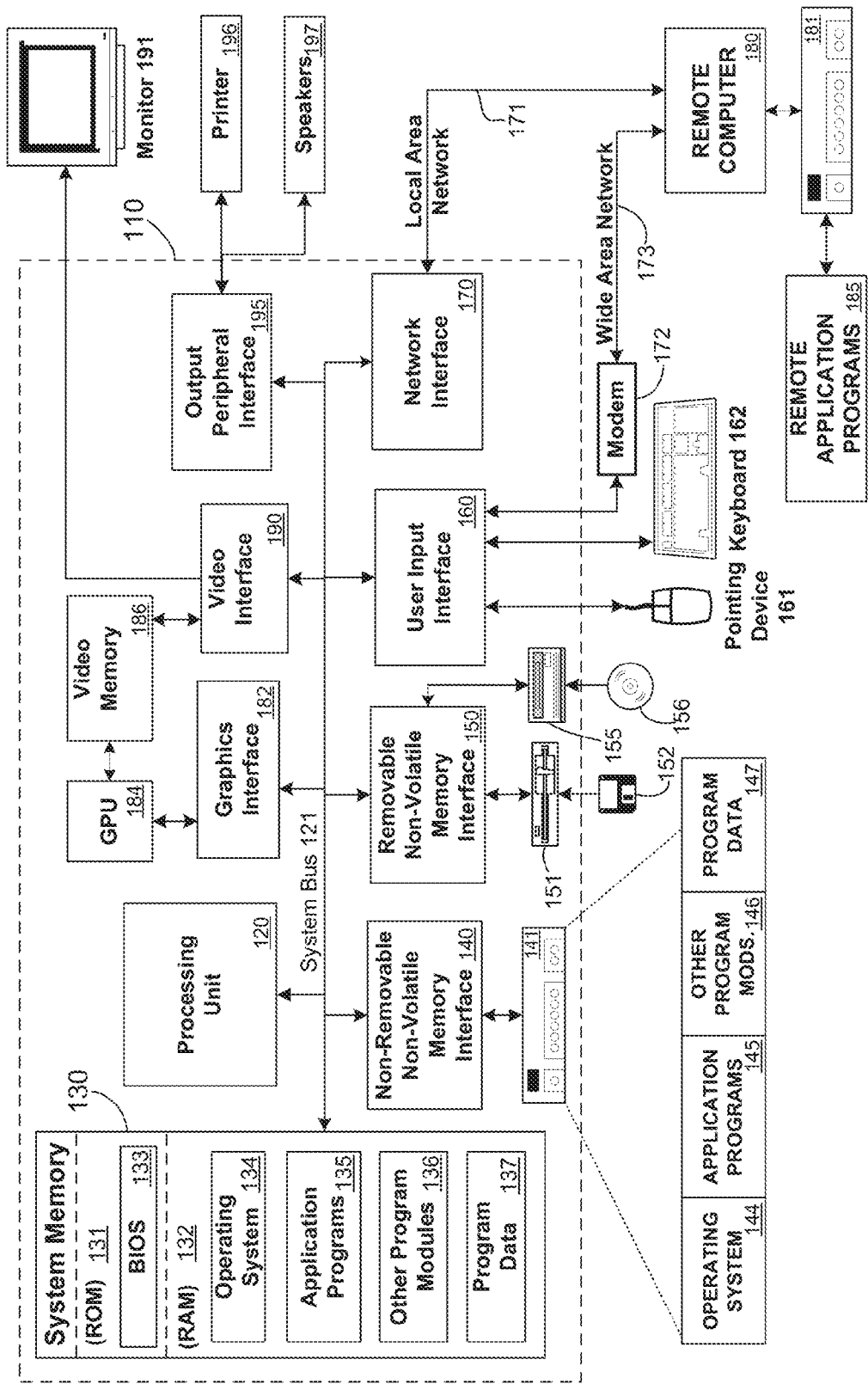
FIG. 1 provides a brief general description of a suitable computing device in connection with which the invention may be implemented.

FIG. 1 and the following discussion are intended to provide a brief general description of a suitable computing device in connection with which the invention may be implemented. For example, any of the client and server computers or devices may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the invention may be implemented with a thin client having network/bus interoperability and interaction. Thus, the invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand held or laptop devices, multi processor systems, microprocessor based systems, programmable consumer electronics, network PCs, appliances, lights, environmental control elements, minicomputers, mainframe computers and the like.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Virtual Machines

Figure 2:
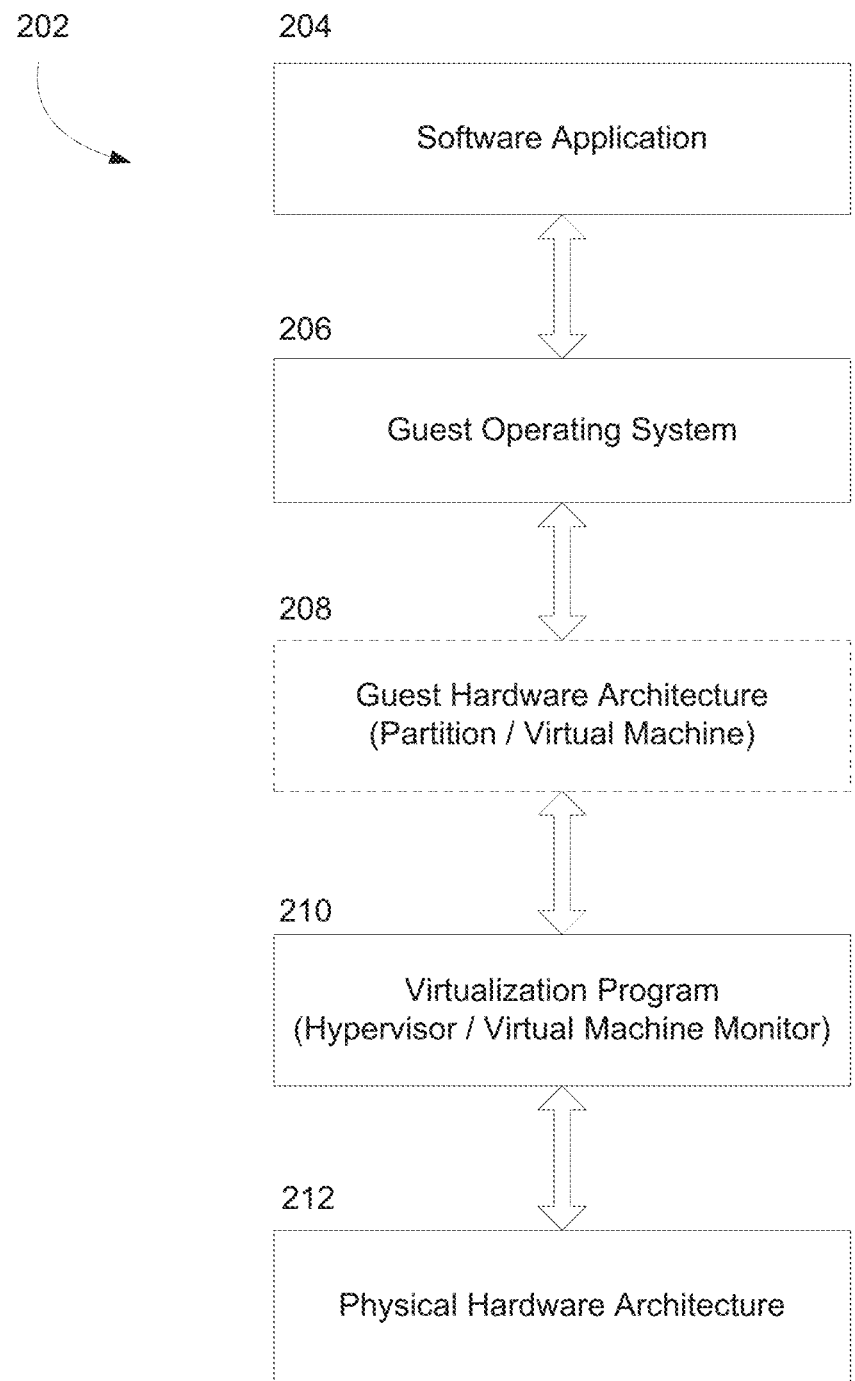
FIG. 2 is a block diagram representing the logical layering of the hardware and software architecture for an emulated operating environment in a computer system.

FIG. 2 is a diagram representing the logical layering of the hardware and software architecture for a virtualized environment in a computer system. In the figure, a virtualization program 210 runs directly or indirectly on the physical hardware architecture 212. The virtualization program 210 may be (a) a virtual machine monitor (VMM) that runs alongside a host operating system or a host operating system with a hypervisor component wherein the hypervisor component performs the virtualization. The virtualization program 210 virtualizes a guest hardware architecture 208 (shown as dashed lines to illustrate the fact that this component is a partition or a "virtual machine"), that is, hardware that does not actually exist but is instead virtualized by the virtualizing program 210. A guest operating system 206 executes on the guest hardware architecture 208, and a software application 204 runs on the guest operating system 206. In the virtualized operating environment of FIG. 2, the software application 204 can run in a computer system 202 even if the software application 204 is designed to run on an operating system that is generally incompatible with a host operating system and the hardware architecture 212.

Figure 3A:
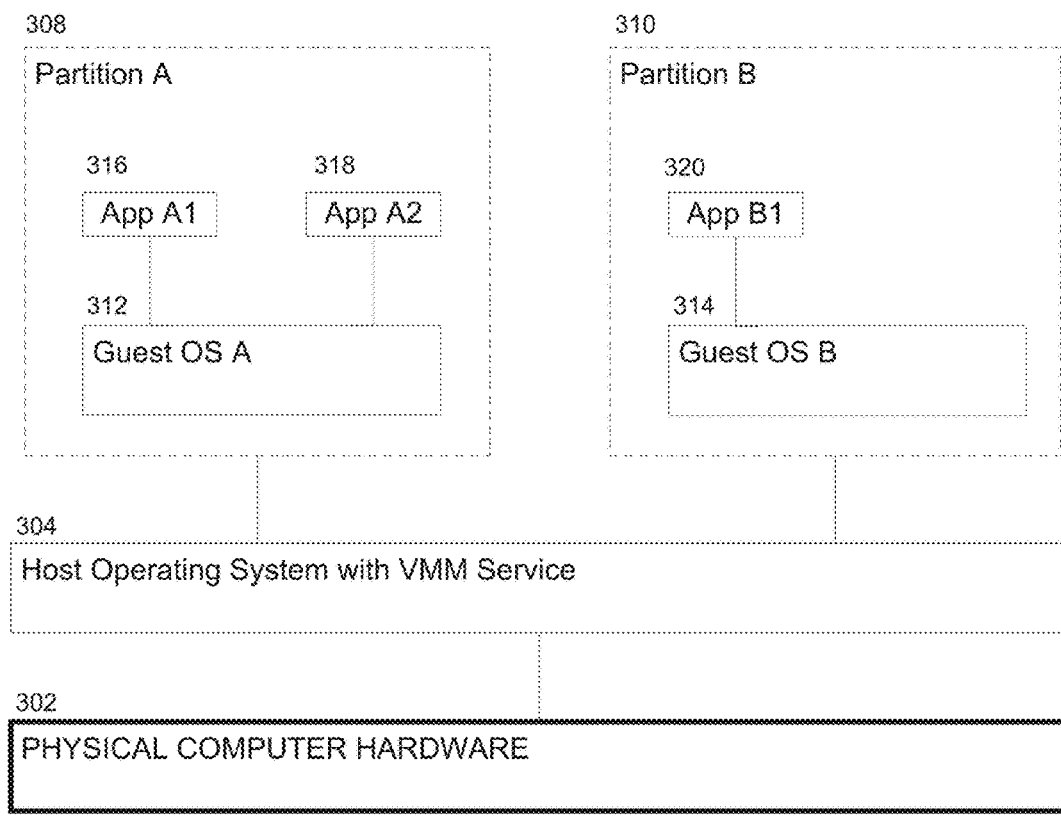
FIG. 3A is a block diagram representing a virtualized computing system wherein the emulation is performed by the host operating system (either directly or via a hypervisor)

FIG. 3A illustrates a virtualized computing system comprising a host operating system (host OS) software layer 304 running directly above physical computer hardware 302, where the host OS 304 provides access to the resources of the physical computer hardware 302 by exposing interfaces to partitions A 308 and B 310 for the use by operating systems 312 and 314, respectively. This enables the host OS 304 to go unnoticed by operating system layers 312 and 314 running above it. Again, to perform the virtualization, the host OS 304 may be a specially designed operating system with native virtualization capabilities or, alternately, it may be a standard operating system with an incorporated hypervisor component for performing the virtualization (not shown).

Referring again to FIG. 3A, above the host OS 304 are two partitions, partition A 308, which may be, for example, a virtualized Intel 386 processor, and partition B 310, which may be, for example, a virtualized version of one of the Motorola 680X0 family of processors. Within each partition 308 and 310 are guest operating systems (guest OSs) A 312 and B 314, respectively. Running on top of guest OS A 312 are two applications, application A1 316 and application A2 318, and running on top of guest OS B 314 is application B1 320.

In regard to FIG. 3A, it is noted that that partition A 308 and partition B 314 (which are shown in dashed lines) are virtualized computer hardware representations that exist only as software constructions. They are made possible due to the execution of specialized virtualization software(s) that not only presents partition A 308 and partition B 310 to guest OS A 312 and guest OS B 314, respectively, but which also performs all of the software steps necessary for guest OS A 312 and guest OS B 314 to indirectly interact with the real physical computer hardware 302.

Figure 3B:
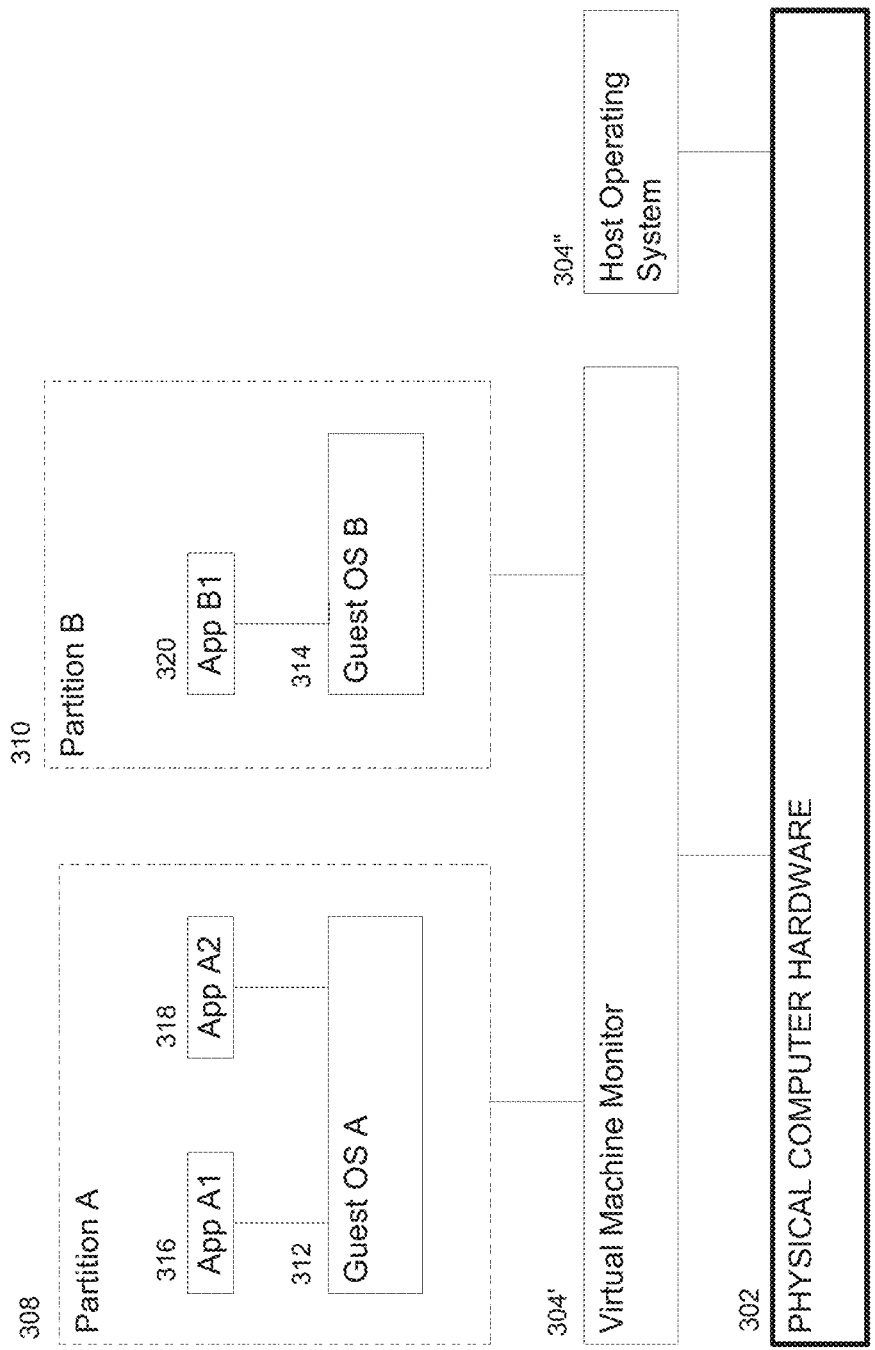
FIG. 3B is a block diagram representing an alternative virtualized computing system wherein the emulation is performed by a virtual machine monitor running side-by-side with a host operating system.

FIG. 3B illustrates an alternative virtualized computing system wherein the virtualization is performed by a VMM 304' running alongside the host operating system 304". In certain cases, the VMM 304' may be an application running above the host operating system 304" and interacting with the computer hardware 302 only through the host operating system 304". In other cases, as shown in FIG. 3B, the VMM 304' may instead comprise a partially independent software system that on some levels interacts indirectly with the computer hardware 302 via the host operating system 304" but on other levels the VMM 304' interacts directly with the computer hardware 302 (similar to the way the host operating system interacts directly with the computer hardware). And yet in other cases, the VMM 304' may comprise a fully independent software system that on all levels interacts directly with the computer hardware 302 (similar to the way the host operating system interacts directly with the computer hardware) without utilizing the host operating system 304" (although still interacting with the host operating system 304" in order to coordinate use of the computer hardware 302 and avoid conflicts and the like).

All of these variations for implementing the above mentioned partitions are just exemplary implementations, and nothing herein should be interpreted as limiting the invention to any particular virtualization aspect.

Operating in a VM Environment

Figure 4:
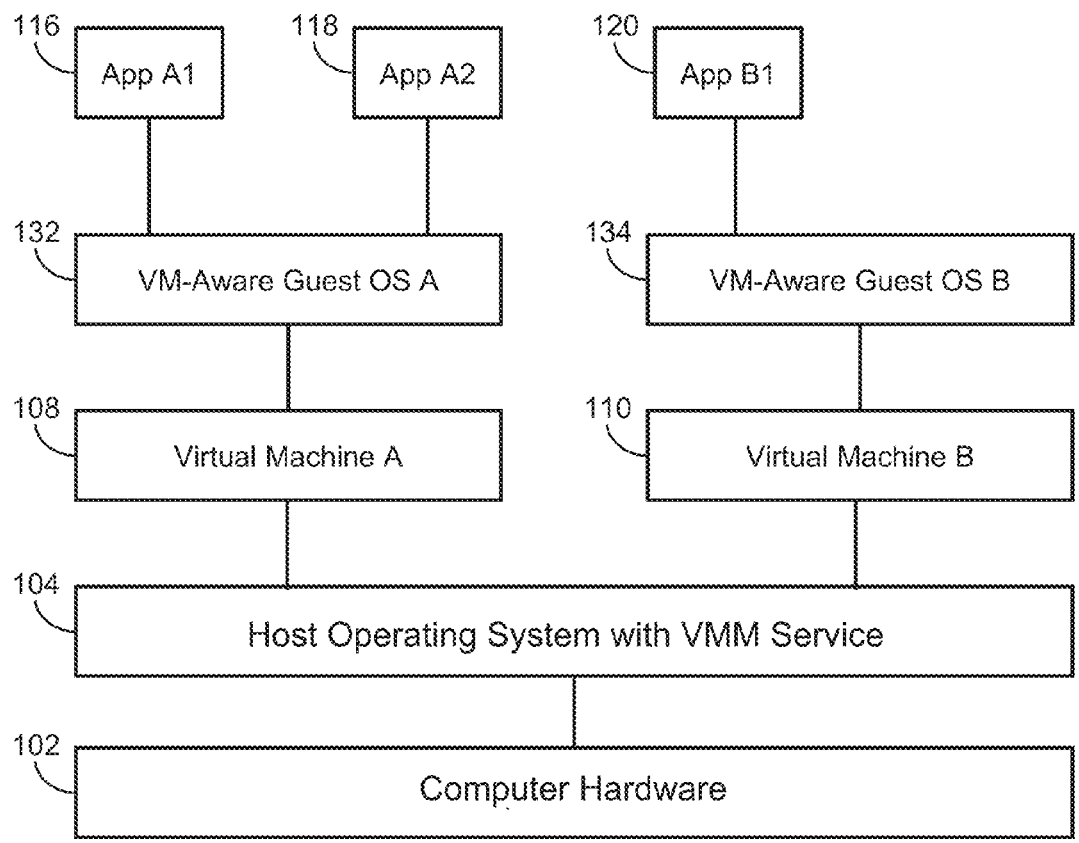
FIG. 4 illustrates a virtualized computing system from FIG. 3A further comprising a host operating system with VM-aware guest operating systems.

FIG. 4 illustrates a virtualized computing system similar to that shown in FIG. 3A, but in FIG. 4, a VM-aware guest OS A 132 and a VM-aware guest OS B 134 have replaced guest OS A 112 and guest OS B 114, respectively. VM-aware guest OS A 132 and VM-aware guest OS B 134 are operating systems that are able to ascertain whether they are operating in a virtual machine environment and, if so, are able to modify their behavior to operate more efficiently.

Figure 5:
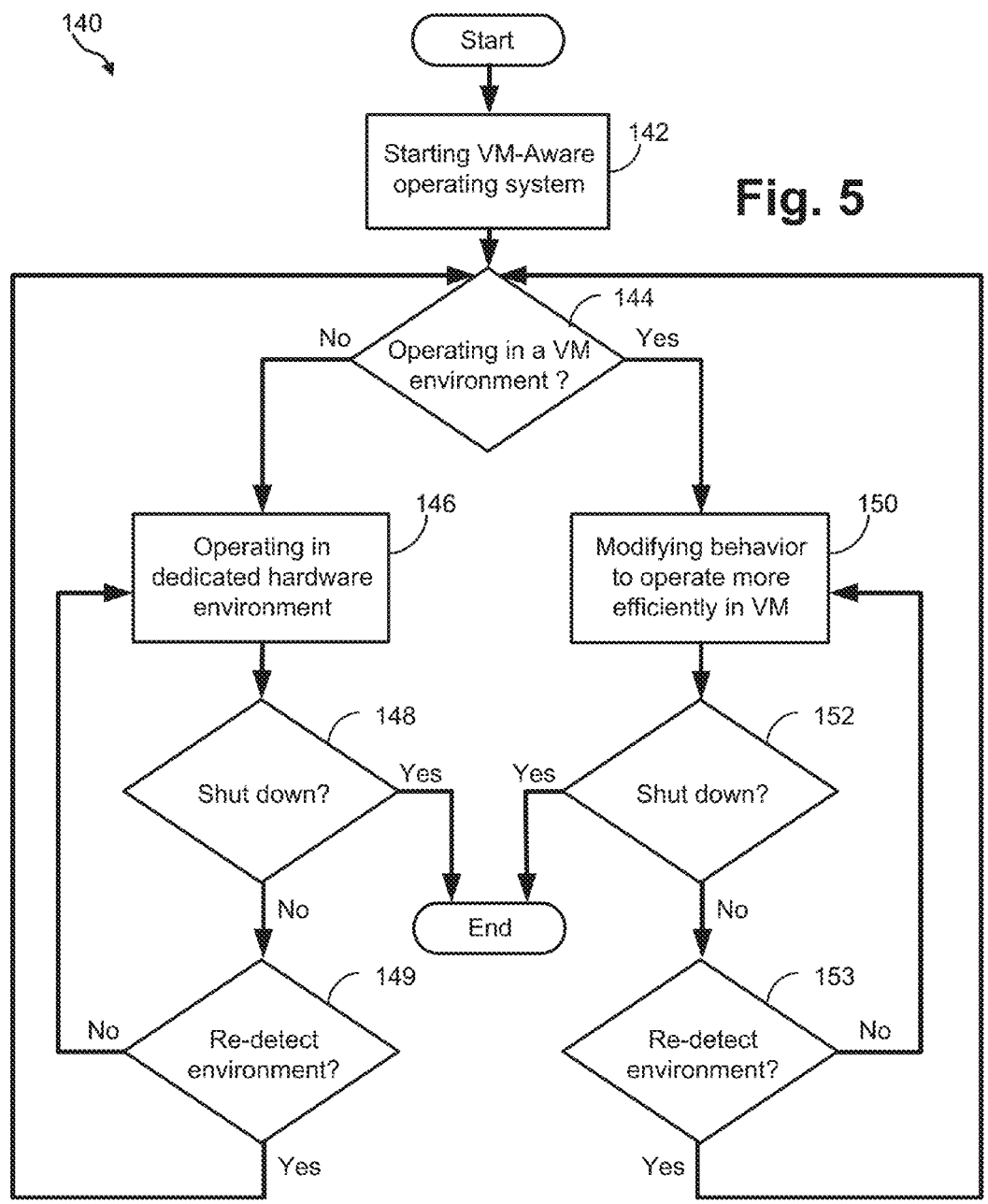
FIG. 5 is a flowchart that illustrates a method of implementing a VM-aware guest operating system with the capability to detect a virtual machine environment and modify its behavior in order to improve efficiency in a virtual machine environment.

An example operation of VM-aware guest OS A 132 and VM-aware guest OS B 134 of FIG. 4 is described in reference to FIG. 5, which is a flowchart that illustrates a method 140 of implementing a VM-aware operating system with the capability to detect a virtual machine environment and modify its behavior in order to improve efficiency in a virtual machine environment. At step 142, the method first comprises starting the VM-aware operating system (e.g., VM-aware guest OS A 132 or VM-aware guest OS B 134).

At step 144, the VM-aware OS determines whether it is operating in a VM environment. The OS may make this determination upon startup, or one or more times at any point during its operation. This determination is done by any of a variety of methods, including the use of synthetic instructions, as described in U.S. patent application Ser. No. 10/685,051 filed on Oct. 14, 2003 and entitled, "SYSTEMS AND METHODS FOR USING SYNTHETIC INSTRUCTIONS IN A VIRTUAL MACHINE" (hereinafter the '051 patent application), incorporated herein by reference in its entirety. The '051 patent application describes a method for an operating system to determine whether it is running on a virtualized processor or running directly on an x86 processor, by executing a synthetic instruction (e.g., VMCPUID) for returning a value representing an identity for the central processing unit. If a value is returned, the guest OS concludes that the operating system is running on a virtualized processor; if an exception occurs in response to the synthetic instruction, the guest OS concludes that the operating system is running directly on an x86 processor. Another method for determining whether the guest OS is running in a VM environment include running a series of tests threads and comparing performance of the current environment to historical results. In any event, if the VM-aware OS determines that it is not operating in a VM environment, method 140 proceeds to step 146. Alternatively, if the VM-aware OS determines that it is operating in a VM environment, method 140 proceeds to step 150. Another method for determining whether the guest OS is running the VM environment includes testing a feature bit returned by querying a processor features field by executing a CPUID instruction. A hitherto undefined feature bit in this field, which is set to zero by the processor hardware, is set to one by the VMM when it intercepts the execution of CPUID and modifies it to communicate the presence of a VM environment.

At step 146, the VM-aware OS operates in its "traditional" manner, because it is operating on dedicated hardware and is not in a VM environment. At step 148, the VM-aware operating system determines whether a "shut down" command has been received. If a "shut down" command is received, the VM-aware OS shuts down and method 140 ends. If no "shut down" command has been received, the VM-aware OS may determine whether to re-detect the environment at step 149. If not, the method continues to operate in the "traditional" manner, as described in step 146. If so, the method returns to step 144 to re-detect whether it is running in a VM environment. It is contemplated that step 149 may be optional and/or performed, on a regular basis, upon notification that the run-time environment may have changed, or based on some other heuristic that decides when it is appropriate to make this determination again. If step 149 is bypassed or omitted, then the method will return to step 146.

At step 150, the VM-aware OS modifies its behavior in order to operate more efficiently in a VM environment, described further herein. At step 152, the VM-aware OS determines whether a "shut down" command has been received. If a "shut down" command is received, the VM-aware OS shuts down and method 140 ends. If no "shut down" command has been received, the VM-aware OS may determine whether to re-detect the environment at step 153. If not, the method continues to operate in its modified, high-efficiency mode, as described in step 150. If so, the method returns to step 144 to re-detect whether it is running in a VM environment. Like step 149, it is contemplated that step 153 may be optional and/or performed, on a regular basis, upon notification that the run-time environment may have changed, or based on some other heuristic that decides when it is appropriate to make this determination again. If step 153 is bypassed or omitted, then the method will return to step 150.

Some example methods and techniques described herein have the operating system submitting requests to the VMM or hypervisor by a mechanism of submitting a request termed a hypercall to a software construct termed a virtualization device, as described in U.S. patent application Ser. No. 10/985,360 filed on Nov. 4, 2004 and entitled, "SYSTEM AND METHOD FOR INTERRUPT HANDLING", incorporated herein by reference in its entirety. Although the examples herein may refer to hypervisors, the examples are also applicable to VMMs and should not be limited thereto.

Figure 6:
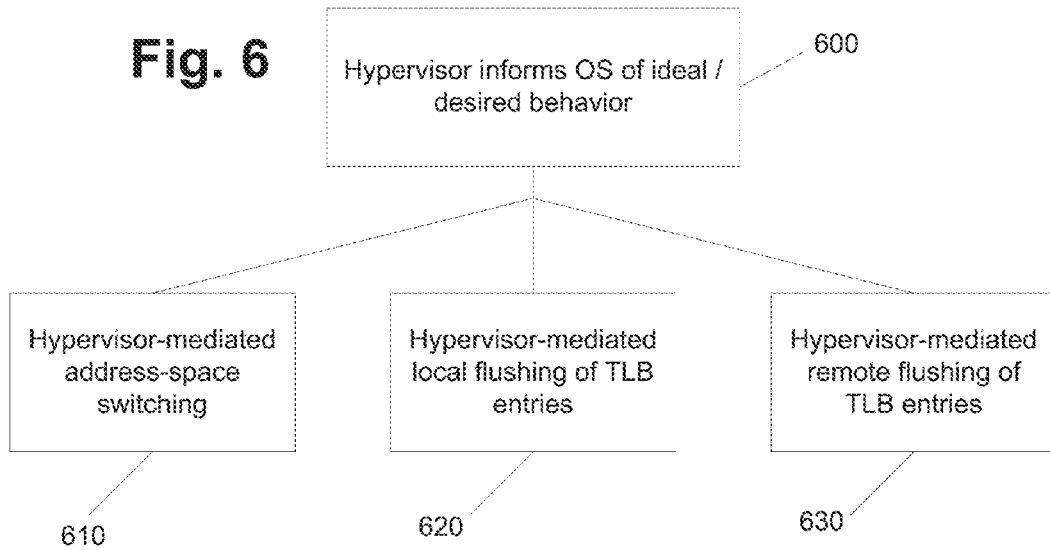
FIG. 6 is a diagram showing example desired behavior indicated to the operating system by the virtual machine monitor.

As noted above, after the OS determines at step 144 that it is operating in a VM environment, its behavior is modified at step 150. According to an embodiment, behavior modification includes a VMM or hypervisor informing an operating system of ideal or desired behavior for running on a VMM or hypervisor at step 600 as shown in FIG. 6, and the operating system then makes the recommended adjustments to its behavior. A VMM or hypervisor may provide via a hypercall (e.g., HvGetSystemFeature) information such as which TLB-related operations should be performed via a hypercall. Example operations that can be performed via virtualization device include:

(1) Hypervisor-mediated address-space switching (step 610). If the hypervisor indicates this feature should be used, operating systems desirably change address spaces on virtual processors by issuing a hypercall (e.g., an HvSwitchVirtualAddressSpace hypercall) rather than using an architectural technique (e.g., architectural "mov cr3, reg" technique). Unlike the architectural method, the hypercall does not have the side effect of flushing TLB entries.

(2) Hypervisor-mediated local flushing of TLB entries (step 620). If the hypervisor indicates this feature should be used, operating systems should flush TLBs on the current processor by issuing a hypercall (e.g., an HvFlushVirtualAddressSpace hypercall) rather than using architectural flushing techniques such as multiple invlpg instructions, reloading cr3, or toggling the global bit in cr4. Unlike the architectural method, a single hypercall can specify the specific address space(s) of interest and flush multiple entries, all in one instruction. This minimizes the number of address spaces a translation is removed from, and it minimizes the number of transitions to the hypervisor.

(3) Hypervisor-mediated remote flushing of TLBs entries (step 630). If the hypervisor indicates this feature should be used, operating systems should flush TLBs on other virtual processors by issuing a hypercall (e.g., an HvFlushVirtualAddressSpace hypercall) rather than performing the traditional TLB-shootdown algorithm of sending an inter-processor interrupt (IPI) to each processor and having each IPI flush its own processor's TLB. The hypercall can take a mask in which a set bit indicates the corresponding processor should be flushed. Alternately, groups of processors can be described by group number as well. The operating system need not wait for each virtual processor to be scheduled. The hypervisor can queue the work until the virtual processor is next scheduled while simultaneously allowing the initiating virtual processor to continue, safe in the knowledge that all subsequent execution will reflect the flush request. This avoids the potentially large cost from the OS issuing an IPI to a virtual processor that may not be scheduled and waiting for that IPI to complete.

Depending on the level of virtualization assistance from the underlying hardware, a hypervisor may indicate all features should be used (little virtualization support from the underlying hardware), a few, or perhaps even none to achieve the optimal or desired behavior, performance, or scalability.

Figure 7:
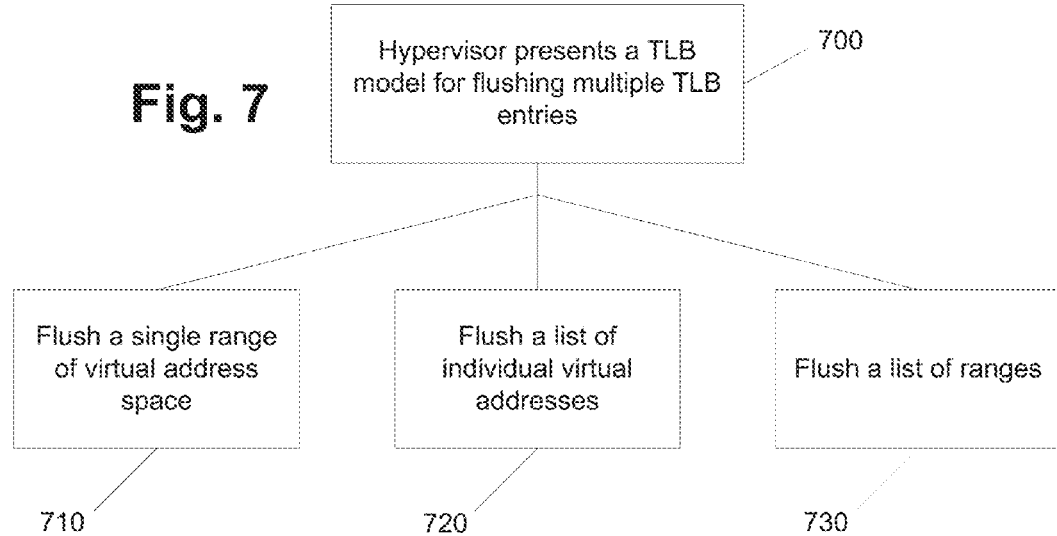
FIG. 7 is a diagram showing example TLB flushing operations.

Another embodiment includes a method in which the hypervisor presents a TLB model that supports operations for flushing of multiple TLB entries (step 700) specified by range, by list, or by list of ranges, as shown with respect to FIG. 7. A method in which an operating system uses these features is also presented.

The hypervisor can provide a hypercall (e.g., an HvFlushVirtualAddressSpaceRange hypercall) to flush a single range of virtual address space, specified by a base and limit, or a base and length (step 710). An operating system may use this when performing operations that affect virtually contiguous blocks of address space, such as unloading a DLL or driver.

The hypervisor can also provide a hypercall (e.g., an HvFlushVirtualAddressSpaceList hypercall) to flush a list of individual virtual addresses (step 720). An operating system may use this when performing operations that affect many unrelated and noncontiguous virtual addresses. This might happen for instance after trimming the set of least recently used pages in a system, e.g., backing up those pages to disk and monitoring any future writes.

Also, the hypervisor can provide a hypercall (e.g., an HvFlushVirtualAddressSpaceRangeList hypercall) taking a list of ranges, where the bits normally describing the offset into a page are repurposed to make a page count (step 730). An operating system may use this when performing operations that affect several disjoint blocks of address space.

Figure 8:
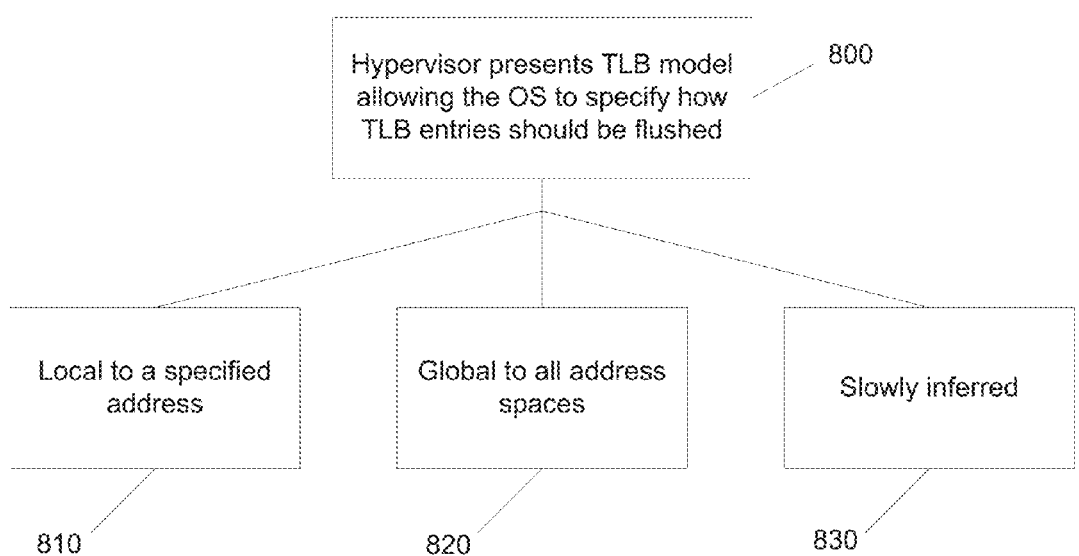
FIG. 8 is a diagram showing further example hints that may be provided by the operating system to the virtual machine monitor during flushing operations.

Another embodiment includes a method in which the hypervisor presents a TLB model allowing the operating system to specify whether TLB entries to be flushed are global to all address spaces, or local to one or more specified address spaces, as shown with respect to FIG. 8. A method in which an operating system uses these features is similarly presented.

Some processor architectures, such as the x86 architecture, store the scope (current address space/all address spaces) of a virtual address translation in the TLB entry. On those architectures, a flush instruction might not contain any hint as to whether the flush request specifies a local or global entry—the hardware instead infers this based on the preexisting TLB entry.

This inference is expensive for a hypervisor. Consequently, a family of virtualization devices (e.g., the HvFlushVirtualAddressSpace a family of virtualization devices) can take a field (step 800) indicating whether the entry is local to the specified address space (step 810), global to all (step 820), or should be (slowly) inferred (step 830). Because the operating system almost always knows this information, it can fill out the field with the optimum value. In addition, this field may be supported in flushing an address space or the entire TLB to enable the operating system to limit the flush to only local or global entries.

Moreover, an operating system may change the maximum number of TLB entries it will flush individually before flushing an entire address space or TLB. When an operating system starts building up a list of virtual addresses whose TLB entries should be flushed, it may stop collecting entries after a certain maximum value has been reached. At this point, it is typically more efficient for the operating system to issue on flush-entire-TLB call (or flush all non-global entries call) rather than flush multiple virtual addresses.

This transition point changes when a hypervisor is present, possibly becoming a much large number. For example, an operating system may change the transition point upon detection of a hypervisor. It may build a larger list or build several smaller lists and specify each in a series of calls (e.g., HvFlushVirtualAddressSpace). An operating system may even act as if the transition point is effectively infinity if the real number is so high as to be larger than almost all lists it will ever build.

Additionally, an operating system may efficiently build up batches of TLB entries to flush before invoking the hypervisor. An operating system might normally build its list of virtual addresses to be flushed on the stack of the current thread. In a hypervisor environment, however, this list may be larger than is safe or desirable to place on a stack, as an incoming interrupt service routine may not be left with sufficient space on the stack to execute properly.

One solution is to use a list of ranges on the stack. Such range lists can act as a compressed intermediary form if the hypervisor does not support range lists itself. Alternately, if the lists are very large as a result of many discontiguous ranges, or the list is not allowed to cross a page, or the hypervisor does not support range lists, the operating system can construct the list on one or more per-processor pages. The operating system desirably ensures the thread stays the exclusive owner of the processor throughout the activity. The technique to do so is operating system specific, and may include disabling all interrupts or masking off just those interrupts used to cause rescheduling.

Furthermore, a hypervisor may dynamically modify its behavior to be optimal for the operating system or for the current state of the underlying hardware that may be managed by the operating system. An operating system can inform a hypervisor, and a hypervisor can correspondingly learn about behavior optimal for an operating system, using the following, for example: (1) an explicit notification identifying individual behavior preferences is made by the operating system; (2) an explicit notification indicating the version of the hypervisor interface to use is made by the operating system; (3) an explicit notification indicating the version of the underlying operating system, from which the hypervisor infers behavior, is made by the operating system; (4) detecting the desired behavior at runtime by watching the pattern of hypercalls. For instance, if a hypervisor detected the use of a particular hypercall (e.g., HvFlushVirtualAddressSpace), it could still support existing architectural operations, but may nonetheless optimize for use of hypercalls instead, letting legacy calls take more time than would otherwise be the case. The notifications may be performed via virtualization device or by writing to an MSR virtualized by the hypervisor, for example.

Another embodiment includes a method in which the hypervisor presents a run-time execution profile to a management partition allowing the operating system within it to determine whether the physical hardware, or portions thereof, are idle, and another method in which the operating system within a management partition communicates to the hypervisor its intent to change the power state of a logical processor. A method in which an operating system uses these features is similarly presented.

According to other aspects, an operating system and a redistributable hypervisor-interface driver may coordinate on settings. A hypervisor-interface driver is a driver that interfaces with the hypervisor even on operating systems that are not hypervisor aware. In an example method, the hypervisor-interface driver first checks with the operating system to see if it is hypervisor-aware. If so, it routes its own requests through the operating system, instead of directly accessing the hypervisor itself. Both the detection and the request routing can be accomplished by checking for a routing interface exposed by the operating system kernel. In this way, a hypervisor-aware operating system can centralize the code for interfacing with a hypervisor, and allow a hypervisor-interface driver to run on both enlightened and unenlightened operating systems.

According to other aspects, the efficient operation of operating systems is applied to power management. In particular, in one embodiment, such efficient operation enables coordination of system-wide power changes with virtual machines. Conventional systems enable system-wide power changes to be successfully performed without first notifying virtual machines of the power changes. However, providing notification of impending and completed power changes to virtual machines would enable the virtual machines to perform a number of desirable actions before and after the power changes such as will be described below.

Figure 9:
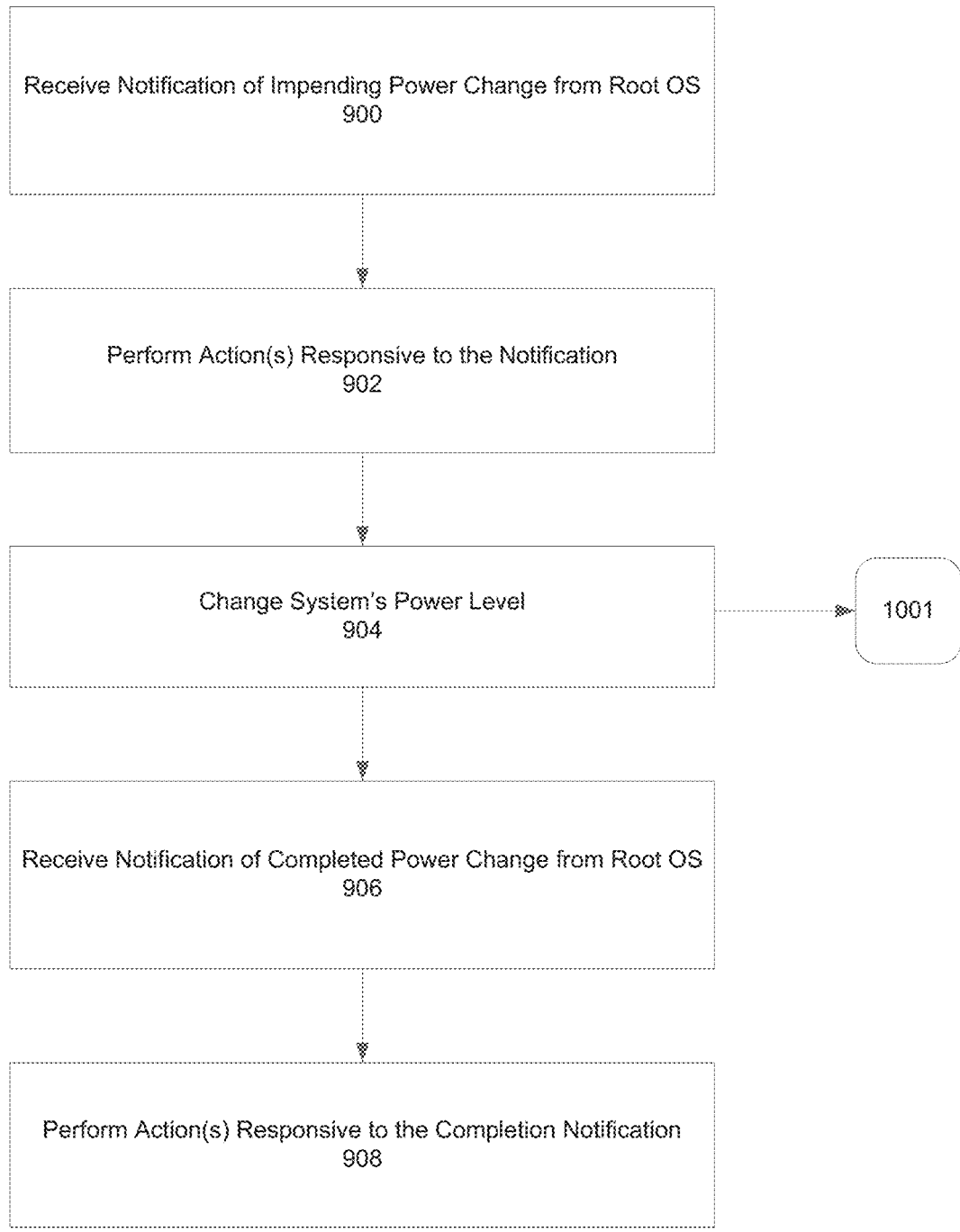
FIG. 9 is a flowchart depicting an exemplary method for coordination of system-wide power changes with virtual machines in accordance with the present invention.

An exemplary method for coordination of system-wide power changes with virtual machines in accordance with the present invention is shown in FIG. 9. At act 900, software executing in a first virtual machine receives a notification of an impending power change. The notification may be provided by the root operating system in a top-down fashion. Thus, the first virtual machine notified by the root operating system may be a direct child of the root operating system. Additionally, if the root operating system has more than one direct child virtual machines, than, at act 900, the root operating system may notify every one of its direct child virtual machines.

At act 902, the software in the first virtual machine takes at least one action in response to the notification. These actions may include forwarding to notification to each virtual machine that is a direct child of the first virtual machine. Those child virtual machines may then, in turn, forward the notification on to each of their direct children, with this process repeating from the top-down until every virtual machine in the system has been notified of the impending power change. The virtual machines may also provide the notification to all of the applications and drivers that are executing in each of the virtual machines.

The action(s) taken at act 902 may also include, for example, auto-saving files to a disk, logging off an instant messaging network, or, when physical hardware is assigned to or under the control of a virtual machine, the software can turn off the device by executing the power down sequences, or any other action that would help prepare for the impending power change. Any such actions may also be performed by the descendant virtual machines when they are notified of the impending power change.

At act 904, the system's power state is changed, and, at act 906, software executing in the first virtual machine receives a notification of the completed power change. Once again, the completion notification may be provided by the root operating system in a top-down fashion. At act 908, the software in the first virtual machine takes at least one action in response to the completion notification. Once again, these actions may include forwarding the completion notification to each descendant virtual machine, with this process repeating from the top-down until every virtual machine in the system has been notified of the completed power change. The virtual machines may also provide the completion notification to all of the applications and drivers that are executing in each of the virtual machines.

The action(s) taken at act 908 may also include, for example, re-logging into a network, rereading files in case of offline changes, restoring state to a previously powered-down device assigned to a virtual machine, or any other action in response to a completed power change. Any such actions may also be performed by the descendant virtual machines when they are notified of the completed power change.

In another power management embodiment, coherent power cycling is provided in a system with a VMM. Such coherent power cycling may enable confidential data that pertains to each of the virtual machines on the system to be secured when the system power state is changed. The term confidential data, as used herein, refers to sensitive data that is used by the VMM to save or restore dynamic context when the VMM switches between different virtual machines. The confidential data may be stored in hardware registers or RAM. Such confidential data may include, for example, passwords, private encryption keys, or other clear text data deemed sensitive by the VMM. It is important that such confidential data not be made available to any operating system or entity other than the VMM.

Figure 10:
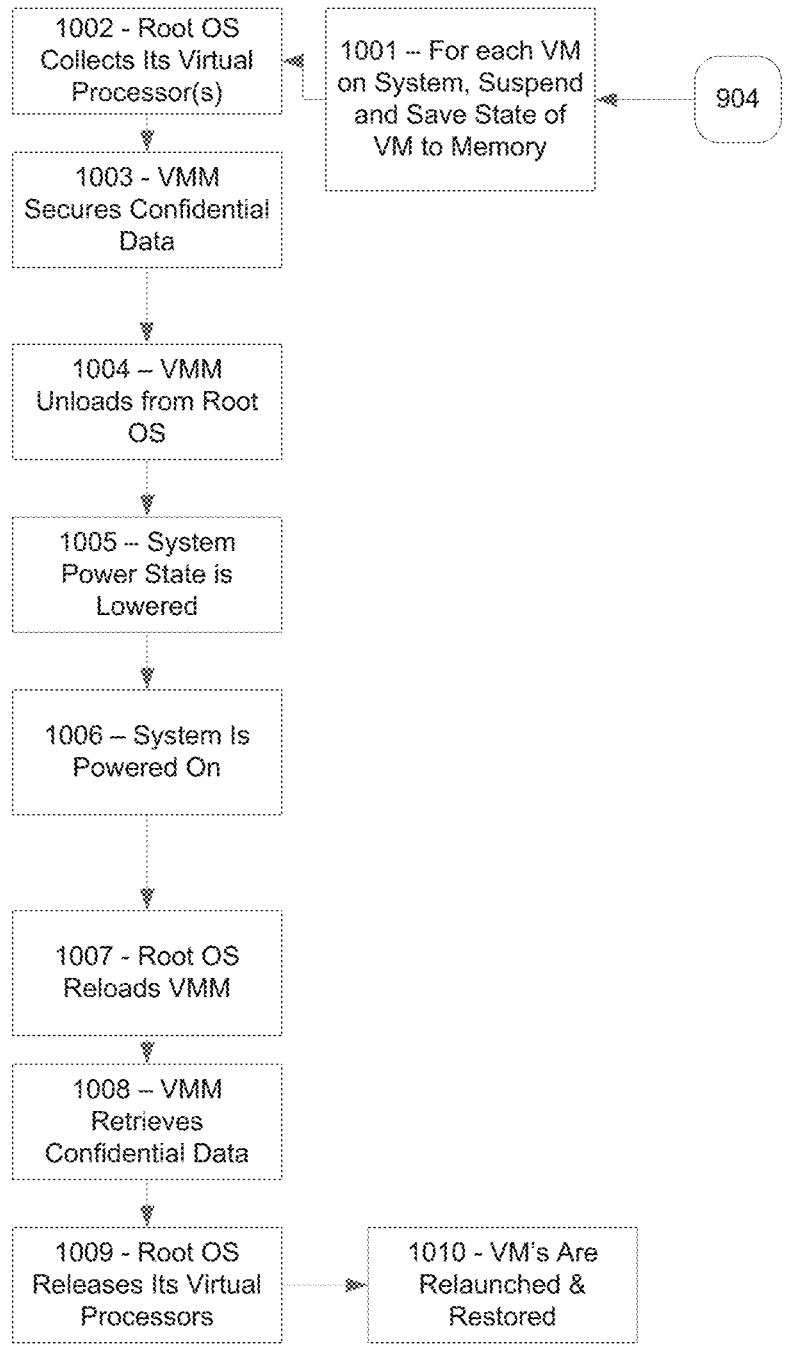
FIG. 10 is a flowchart depicting an exemplary method for coherent power cycling of a system with a VMM in accordance with the present invention.

An exemplary method for coherent power cycling of a system with a VMM in accordance with the present invention is shown in FIG. 10. At act 1001, each virtual machine on the system is suspended and its state is saved to memory. Act 1001 may be performed in a bottom-up fashion. For example, each leaf virtual machine may first be suspended and its state may be saved to memory. Then, the direct parents of each leaf virtual machine may be suspended and their states may be saved to memory. This process may be repeated until finally the root operating system suspends each of its direct child virtual machines and saves their states to memory.

At act 1002, the root operating system collects each of its virtual processors. A collected virtual processor, as that term is used herein, is a virtual processor that is no longer capable of executing arbitrary code such as arbitrary application code or arbitrary driver code. Such arbitrary code could potentially call the hypervisor, thereby interfering with future acts.

At act 1003, the VMM secures the confidential data of each virtual machine on the system to prevent the confidential data from being made available to the root operating system (or any other operating system or entity) after the VMM is unloaded. To secure the confidential data, the VMM may, for example, delete the confidential data from memory. The VMM may also, for example, encrypt the confidential data. The VMM may notify the virtual machines to clear or secure the confidential data. Act 1003 is an optional act.

At act 1004, the VMM unloads from the root operating system. Prior to the unloading of the VMM, the root operating system is a virtualized operating system. However, after the unloading of the VMM, the root operating system is de-virtualized. Act 1004 is also an optional act.

At act 1005, the system power state is lowered. The system may, for example, be placed into a standby state or may be completely powered off. As should be appreciated, the root operating system may write memory contents to disk prior to the system power state being lowered. At act 1006, the system is powered on. As should be appreciated, when the system powers on, a basic input/output system (BIOS) may transfer control to the root operating system, which may then read the stored memory contents from the disk.

At act 1007, the root operating system reloads the VMM. Prior to the reloading of the VMM, the root operating system is a not a virtualized operating system. However, after the reloading of the VMM, the root operating system re-virtualized. Act 1007 is an optional act.

At act 1008, the VMM retrieves the secured confidential data of each virtual machine on the system. If, at act 1003, the confidential data was encrypted, then, at act 1007, the VMM may retrieve the confidential data by decrypting it.

The VMM may also notify the restored virtual machine to restore or reconstruct confidential data. Act 1008 is also an optional act.

At act 1009, the root operating system releases each of its virtual processors. A released virtual processor, as that term is used herein, is a virtual processor that is capable of executing arbitrary code.

At act 1010, each virtual machine on the system is re-launched and its state is restored. Act 1010 may be performed in a top-down fashion. For example, the root operating system may first re-launch and restore the state data each of its direct child virtual machines. This process may be repeated from the top-down until finally each of the leaf virtual machines have been re-launched and their state data has been restored.

In another power management embodiment, dynamic control and communication of power state changes is provided. In conventional systems with virtual machines, the VMM typically prevents all code executing in a virtual machine from making changes to the power state of the physical processors. However, to maintain effective control over the physical thermal environment, or to increase the operating time of battery powered systems, some processor management must run to minimize processor power usage depending on the system activity. Although desirable, this power management is problematic because virtual machines are isolated from each other and from the physical system, hence code running in a virtual machine is unable to determine the processor utilization of the entire system or to effect changes to the power state. Thus, one possible solution would be to allow the VMM, which can such obtain system-wide processor utilization data, to control power state changes. However, this solution also creates problems because procedures for controlling processor power states vary across different processor models and/or vendors. Therefore, allowing the VMM to control power state changes would require the replication of machine dependent algorithms within the VMM, thereby presenting possible security and other efficiency concerns.

To overcome the aforementioned and other problems, this embodiment of the present invention enables the VMM to designate a particular virtual machine to be a power management agent with the authority to control power state changes. Such power management authorization may be inherited. For example, the first or root virtual machine may be designated by default as the power management agent. Alternatively, such power management authorization may be assigned by an authorization interface. The operating system code for the power management agent is able to access physical processor power management controls.

If the power management agent acted only on its own internal view of its utilization, it would inaccurately determine the system-wide processor utilization and make inappropriate adjustments to the processor power states. Thus, prior to making a power state change, the power management agent will request system wide processor utilization information from the VMM. Furthermore, when an operating system places a processor into a low power state, the operating system expects that the processor will be unavailable for scheduling until a physical interrupt returns the processor to a full power state. Thus, the power management agent needs to inform the underlying VMM of impending power state changes to so that the VMM can schedule the affected processor accordingly.

Figure 11:
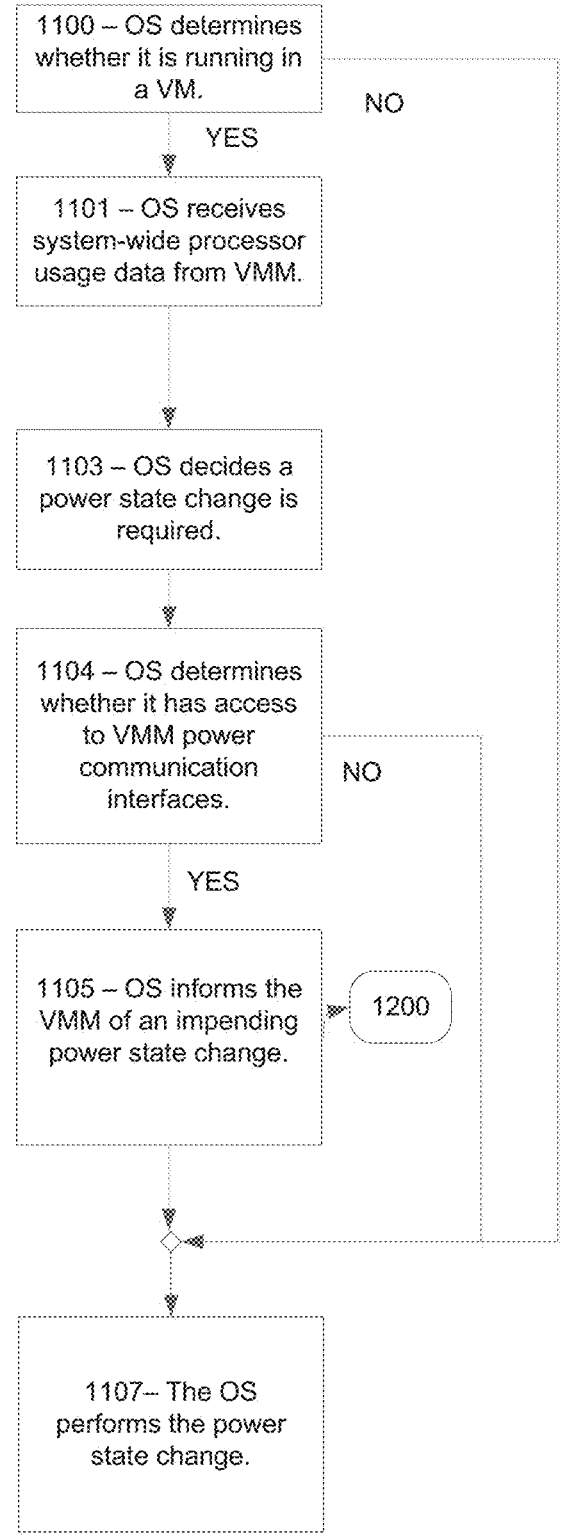
FIGS. 11 and 12 are flowcharts depicting exemplary methods for dynamic control and communication of power state changes in accordance with the present invention.
Figure 12:
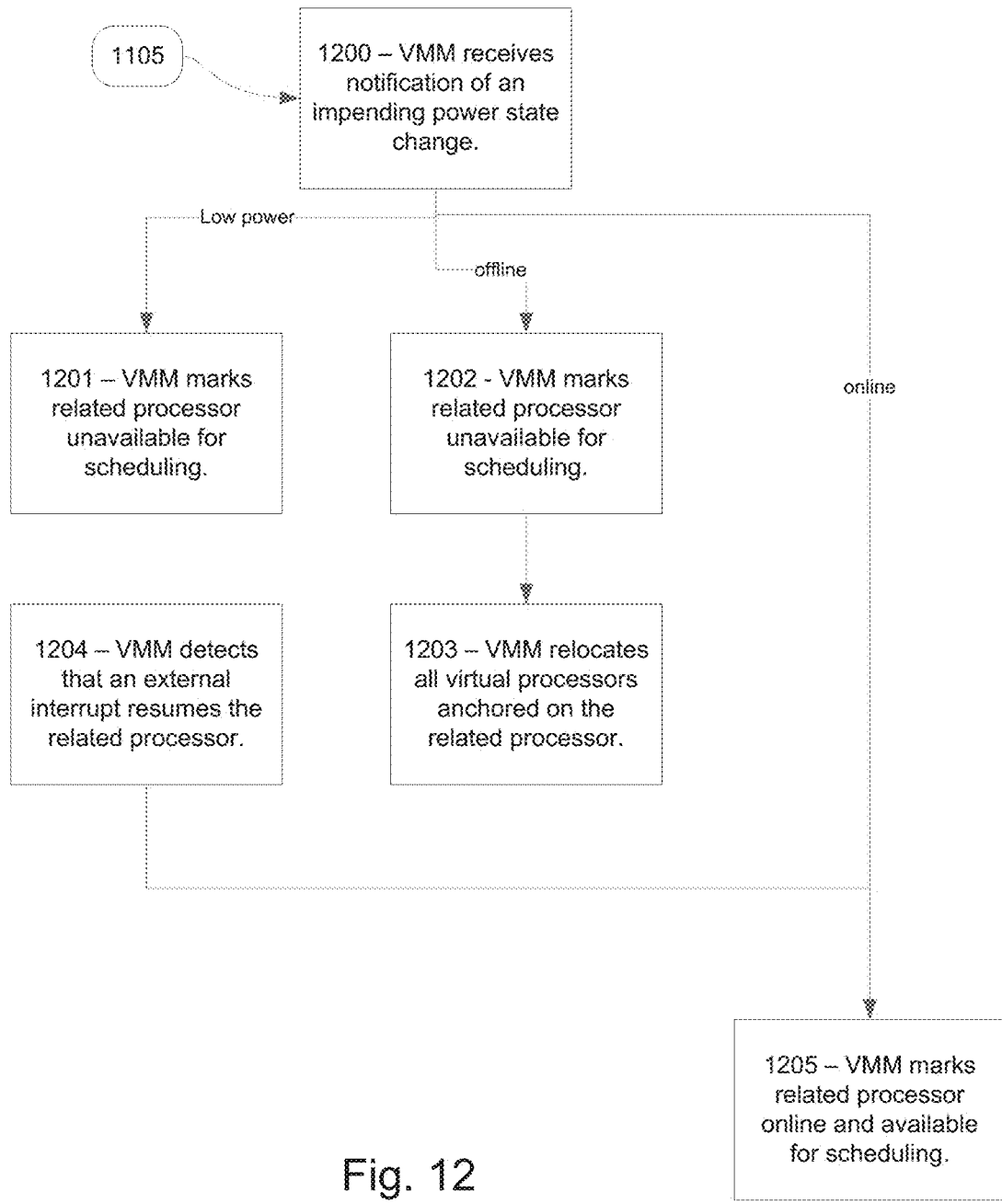

Exemplary methods for dynamic control and communication of power state changes in accordance with the present invention are shown in FIGS. 11 and 12. In particular, FIG. 11 depicts exemplary acts performed by an operating system. At act 1100, the operating system determines whether it is running in a virtual machine. If not, then the operating system will simply perform power state changes as a conventional non-virtualized operating system, obtaining processor usage data from traditional means. If the operating system is running in a virtual machine, then, at act 1101, the operating system receives system-wide processor usage data from the VMM. The system-wide processor usage data may include, for example, system-wide accumulated physical processor run-time data. The system-wide processor usage data may also include, for example, a reference global time to assist the power management agent in determining utilization throughout particular intervals.

At act 1103, the operating system determines, based on the system-wide processor usage data, that a power state change is required. At act 1104, the operating system determines whether it has access to VMM power communication interfaces. If the operating system is not designated as the power management agent, then the operating system will not have access to the VMM power communication interfaces. Thus, the operating system will not be able to communicate its intent to the VMM, and, therefore, the VMM will not schedule the affected processor accordingly. If, on the other hand, the operating system is designated as the power management agent, then the operating system will have access to the VMM power communication interfaces. Thus, at act 1105 the operating system will inform the VMM of the impending power state change, and, therefore, the VMM will schedule the affected processor accordingly (see FIG. 12 described in detail below). At act 1107, the operating system performs the power state change.

FIG. 12 depicts exemplary actions performed by the VMM when it receives the power state change notification sent by the operating system at act 1105. At act 1200, the VMM receives the power state change notification. If the power state change is a change to a low power state, then, at act 1201, the VMM marks the related physical processor unavailable for scheduling virtual processors other than the notifying virtual processor. The notifying virtual processor remains scheduled to allow the operating system to complete its intended power state change. The related physical processor then remains in the low power state until, at act 1204, the VMM detects that an external interrupt resumes the physical processor. Upon detecting the interrupt, the VMM marks the related physical processor online and available for scheduling at act 1205.

When the VMM receives an offline processor notification, at act 1202, it marks the related physical processor unavailable for scheduling virtual processors other than the notifying virtual processor. At act 1203, the VMM relocates to other processors all virtual processors, except the notifying virtual processor, that were prepared to run on the related physical processor. The related physical processors then remains unscheduled until a specific online notification is received. When the online notification is received, the VMM marks the related physical processor online and available for scheduling at act 1205.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
    a processor;
    one or more memories in communication with the processor when the system is operational, the one or more memories having stored thereon instructions that upon execution by the processor at least cause the system to:
    receive by a first virtual machine a notification of an impending system power change;
    in response to the notification, perform an action by the first virtual machine to prepare for the impending system power change; and
    forward, by the first virtual machine, a second notification to a second virtual machine.

2. The system of claim 1, the one or more memories having further stored thereon instructions that upon execution by the processor at least cause the system to forward, by the first virtual machine, the first and second notifications to the second virtual machine.

3. The system of claim 1, wherein the action comprises powering down a connected device assigned to the first virtual machine.

4. The system of claim 1, wherein the action comprises saving files to a disk.

5. The system of claim 2, the one or more memories having further stored thereon instructions that upon execution by the processor at least cause the system to take at least one first and second action by the second virtual machine in response to the received first and second notifications.

6. The system of claim 1 the one or more memories having further stored thereon instructions that upon execution by the processor at least cause the system to perform one of a retrieval, a restoration, and a reconstruction of confidential data of each virtual machine on the system.

7. The system of claim 1 the one or more memories having further stored thereon instructions that upon execution by the processor at least cause the system to notify a virtual machine monitor that a power state change is required.

8. A computer-readable storage device having stored thereon computer-readable instructions that upon execution on a processor, at least cause a computing device to:
    receive by a first virtual machine a notification of an impending system power change;
        in response to the notification, perform an action by the first virtual machine to prepare for the impending system power change; and
        forward, by the first virtual machine, a second notification to a second virtual machine.

9. The computer-readable storage device of claim 8 having further stored thereon computer-readable instructions that upon execution on a computing device, at least cause the computing device to forward, by the first virtual machine, the first and second notifications to the second virtual machine.

10. The computer-readable storage device of claim 9 having further stored thereon computer-readable instructions that upon execution on a computing device, at least cause the computing device to take at least one first and second action by the second virtual machine in response to the received first and second notifications.

11. The computer-readable storage device of claim 8, wherein the action comprises powering down a connected device assigned to the first virtual machine.

12. The computer-readable storage device of claim 8, wherein the action comprises saving files to a disk.

13. The computer-readable storage device of claim 8 having further stored thereon computer-readable instructions that upon execution on a computing device, at least cause the computing device to perform one of a retrieval, a restoration, and a reconstruction of confidential data of each virtual machine on the system.

14. The computer-readable storage device of claim 8 having further stored thereon computer-readable instructions that upon execution on a computing device, at least cause the computing device to notify a virtual machine monitor that a power state change is required.

15. A method for efficiently managing power used by one or more computing devices, comprising:
  receive by a first virtual machine a notification of an impending system power change;
  in response to the notification, perform an action by the first virtual machine to prepare for the impending system power change; and
  forward, by the first virtual machine, a second notification to a second virtual machine.

16. The method of claim 15 further comprising forwarding, by the first virtual machine, the first and second notifications to the second virtual machine.

17. The method of claim 16 further comprising taking at least one first and second action by the second virtual machine in response to the received first and second notifications.

18. The method of claim 15, wherein the action comprises powering down a connected device assigned to the first virtual machine.

19. The method of claim 15, wherein the action comprises saving files to a disk.

20. The method of claim 15 further comprising notifying a virtual machine monitor that a power state change is required.

* * * * *